(12) United States Patent
Shan et al.

(10) Patent No.: US 9,773,001 B2
(45) Date of Patent: *Sep. 26, 2017

(54) METHOD, APPARATUS, AND SYSTEM FOR PROCESSING MEDIA RESOURCE PLAYLIST IN LOCAL AREA NETWORK

(71) Applicant: Huawei Device Co., Ltd., Shenzhen (CN)

(72) Inventors: Zhenwei Shan, Shenzhen (CN); Yu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

This patent is subject to a terminal disclaimer.

(21) Appl. No.: 14/707,667

(22) Filed: May 8, 2015

(65) Prior Publication Data

US 2015/0242398 A1 Aug. 27, 2015

Related U.S. Application Data

(63) Continuation of application No. 13/689,122, filed on Nov. 29, 2012, now Pat. No. 9,092,462, which is a
(Continued)

(51) Int. Cl.
*G06F 7/00* (2006.01)
*G06F 17/00* (2006.01)
(Continued)

(52) U.S. Cl.
CPC .... *G06F 17/3002* (2013.01); *G06F 17/30117* (2013.01); *G06F 17/30286* (2013.01);
(Continued)

(58) Field of Classification Search
CPC .......... G06F 17/3002; G06F 17/30117; G06F 17/30345; G06F 17/30339;
(Continued)

(56) References Cited

U.S. PATENT DOCUMENTS 6,578,051 B1 * 6/2003 Mastronardi ........ G06Q 20/382
8,516,036 B2 * 8/2013 Park .................. G06F 17/30017
707/621
(Continued)

FOREIGN PATENT DOCUMENTS

CN 1801921 A 7/2006
CN 101506813 A 8/2009
(Continued)

OTHER PUBLICATIONS

AVTransport:3 Service, Standardized DCP (SDCP)—Service Template Version 1.01. Dec. 31, 2010, 131 pages.
(Continued)

*Primary Examiner* — Azam Cheema
(74) *Attorney, Agent, or Firm* — Brinks Gilson & Lione (57) ABSTRACT

A method for processing a media resource playlist in a local area network, where the local area network includes a media server and a media renderer, includes: updating a stored playlist and a stored playlist element table when determining that a state of the media server changes; and sending the updated playlist to the media renderer. In addition, a playlist processing apparatus and a communication system are provided correspondingly.

7 Claims, 5 Drawing Sheets

Related U.S. Application Data continuation of application No. PCT/CN2012/076147, filed on May 28, 2012.

(51) Int. Cl.
| | | |
|---|---|---|
| *G06F 17/30* | (2006.01) | |
| *H04N 21/41* | (2011.01) | |
| *H04N 21/4223* | (2011.01) | |
| *H04N 21/4363* | (2011.01) | |
| *H04N 21/482* | (2011.01) | |
| *H04L 29/08* | (2006.01) | |
| *H04L 12/40* | (2006.01) | |

(52) U.S. Cl.
CPC .. *G06F 17/30339* (2013.01); *G06F 17/30345* (2013.01); *H04L 67/10* (2013.01); *H04N 21/4126* (2013.01); *H04N 21/4223* (2013.01); *H04N 21/43632* (2013.01); *H04N 21/4825* (2013.01); *H04L 2012/40273* (2013.01)

(58) Field of Classification Search
CPC .......... G06F 17/30286; H04N 21/4223; H04N 21/4126; H04N 21/43632; H04N 21/4825; H04L 67/10; H04L 2012/40273
See application file for complete search history.

(56) References Cited

U.S. PATENT DOCUMENTS

| | | | | |
|---|---|---|---|---|
| 9,092,462 | B2 * | 7/2015 | Shan | ................ G06F 17/30286 |
| 2002/0138641 | A1 * | 9/2002 | Taylor | ............... H04L 29/06027 709/231 |
| 2005/0034164 | A1 | 2/2005 | Sano et al. | |
| 2005/0096753 | A1 | 5/2005 | Arling et al. | |
| 2006/0112074 | A1 | 5/2006 | Han | |
| 2006/0168126 | A1 | 7/2006 | Costa-Requena et al. | |
| 2007/0169087 | A1 | 7/2007 | Fadell | |
| 2009/0094248 | A1 | 4/2009 | Petersen | |
| 2009/0292830 | A1 | 11/2009 | Nagashima et al. | |
| 2010/0023578 | A1 | 1/2010 | Brant et al. | |
| 2010/0095332 | A1 | 4/2010 | Gran et al. | |
| 2010/0257203 | A1 * | 10/2010 | Sun | ................... G06F 17/30053 707/780 |
| 2012/0311094 | A1 * | 12/2012 | Biderman | .............. H04N 5/783 709/219 |
| 2013/0051390 | A1 | 2/2013 | Wu et al. | |
| 2013/0174035 | A1 | 7/2013 | Grab | |

FOREIGN PATENT DOCUMENTS

| | | |
|---|---|---|
| CN | 102171687 A | 8/2011 |
| CN | 102238136 A | 11/2011 |
| EP | 2 057 574 | 5/2009 |
| JP | 2008-134967 | 6/2008 |
| JP | 2008-524736 | 7/2008 |
| JP | 2010-003231 | 1/2010 |
| KR | 10-2006-0056192 | 5/2006 |
| KR | 2008-0018778 A | 2/2008 |
| WO | WO 2005/015407 A1 | 2/2005 |
| WO | WO 2006/067612 A1 | 6/2006 |
| WO | WO 2008/124705 A1 | 10/2008 |
| WO | WO 2012057661 A1 | 5/2012 |

OTHER PUBLICATIONS

Miller et al., "UPnP™ Forum AV:4 Overview for DLNA," Power Point Presentation, UPnP Forum 2010, 47 pages.
UPnP™ Device Architecture 1.1, UPnP™ Forum 2008, 136 pages.

* cited by examiner

METHOD, APPARATUS, AND SYSTEM FOR PROCESSING MEDIA RESOURCE PLAYLIST IN LOCAL AREA NETWORK

CROSS-REFERENCE TO RELATED APPLICATIONS

This application is a continuation of U.S. application Ser. No. 13/689,122, filed on Nov. 29, 2012, which is a continuation of International Application No. PCT/CN2012/076147, filed on May 28, 2012, The afore-mentioned patent applications are hereby incorporated by reference in their entireties.

FIELD OF THE INVENTION

The present invention relates to the field of communication technologies, and in particular, to a method, an apparatus, and a system for processing a media resource playlist in a local area network.

BACKGROUND OF THE INVENTION

With the development of electronic digital technologies and digitization of consumer electronics, more and more digital electronic devices are emerging in families, for example, digitized entertainment devices such as a mobile phone or a camera, and household electrical appliances such as a personal computer or a digital television set. How to connect the digital electronic devices in a wired or wireless mode to constitute a local area network, for example, a home network, which can implement functions such as content sharing or mutual control, is a concept that the industry is conceiving and trying to realize. The digital electronic devices constituting the home network are called home network devices.

To facilitate interworking and control of different types of home network devices, a Uniform plug and play (UPnP, Uniform Plug and Play) technology is proposed in the prior art. UPnP is an architecture for global peer-to-peer (P2P, Peer-to-Peer) network connectivity of various digital electronic devices. In a UPnP system, a user controls a home network device through a control point (CP, Control Point) device in a home network; through the UPnP protocol and by invoking related control commands (actions) of the home network device supporting the UPnP technology (hereinafter referred to as a UPnP device), the control point device reads state information of the UPnP device in the home network and controls the UPnP device to perform corresponding operations.

Figure 1A:
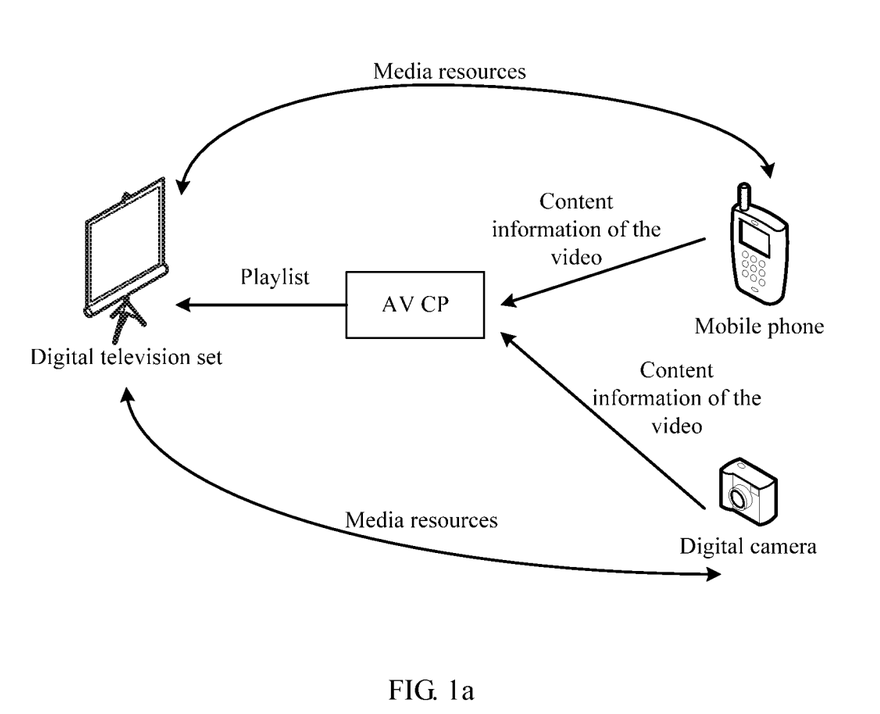
FIG. 1a is a schematic diagram of a scenario of playing media resources in a local area network in the prior art.

To implement a scenario where multiple UPnP devices share media in the home network, UPnP defines an audio and video (AV, Audio and Video) standard; in the AV standard, three apparatuses are defined: a media server (MS, Media Server), a media-playing device (MR, Media Renderer), and a media control point (AV CP, Audio and Video Control Point). The media server is a device for storing media. The media renderer is a device for playing media. The AV CP is an apparatus for controlling the two devices. Through the AV CP, media resources of the media server may be browsed and the media of the media server may be played, which enables the media renderer to play the content in the media server. For example, as shown in FIG. 1a, if a user wants to watch a private video stored in a mobile phone or digital camera (namely, a media server) on a digital television set (namely, a media renderer), the AV CP obtains the content information of the private video from the mobile phone or digital camera, then generates a playlist (Playlist), and sends the playlist to the digital television set for storage, so that the digital television set obtains and plays the media resources (namely, videos) according to the playlist.

In the research and practice of the prior art, the inventor of the present invention finds that: the playlist that is generated by the media server or by the AV CP and sent to the media renderer is temporary; if the media server storing the content associated with the playlist is offline, or the Internet Protocol (IP, Internet Protocol) address changes, or the content itself changes, the playlist is partly or completely invalid, which affects the play experience of the user greatly.

SUMMARY OF THE INVENTION

Embodiments of the present invention provide a method, an apparatus, and a system for processing a media resource playlist in a local area network, so that a continuously valid playlist may be provided to improve the play experience of a user.

A method for processing a media resource playlist in a local area network, where the local area network includes a media server and a media renderer, includes:

updating a stored playlist and a stored playlist element table when determining that a state of the media server changes, where the playlist includes a uniform resource locator of a media resource and a file name of the media resource, and the playlist element table includes at least one of a media resource identifier, a media server identifier, an IP address of the media server, and the uniform resource locator of the media resource; and sending the updated playlist to the media renderer.

A playlist processing apparatus includes:

an updating unit, configured to update a stored playlist and a stored playlist element table when determining that a state of a media server in a local area network changes, where the playlist includes a uniform resource locator of a media resource and a file name of the media resource, and the playlist element table includes at least one of a media resource identifier, a media server identifier, an Internet Protocol address of the media server, and the uniform resource locator of the media resource; and a sending unit, configured to send a generated playlist to a media renderer in the local area network, and when the playlist is updated, send the updated playlist to the media renderer in the local area network.

A communication system includes any playlist processing apparatus according to embodiments of the present invention.

In the embodiments of the present invention, when it is determined that the state of the media server changes, the stored playlist and the stored playlist element table are updated, and the updated playlist is sent to the media renderer in the local area network. In the embodiments of the present invention, because the playlist can be updated in real time, consistency between the playlist and the media source can be ensured, so that a continuously valid playlist may be provided to improve the play experience of a user.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following descriptions merely show some of the embodiments of the present invention, and persons skilled in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons skilled in the art based on the embodiments of the present invention without creative efforts shall fall within the protection scope of the present invention.

Embodiments of the present invention provide a method, an apparatus, and a system for processing a media resource playlist in a local area network. The embodiments of the present invention are described in detail below respectively:

Embodiment 1

The embodiment of the present invention is described from the perspective of a playlist processing apparatus. Specifically, the playlist processing apparatus may be a control point, or the playlist processing apparatus may include a control point and a central server, that is, the control point and the central server jointly perform operations, where the control point may be integrated with a media renderer, a media server, or a central server into a same entity, and the control point may also be a separate entity.

A method for processing a media resource playlist in a local area network includes: updating a stored playlist and a stored playlist element table when determining that a state of a media server in the local area network changes; and sending the updated playlist to a media renderer in the local area network.

Figure 1B:
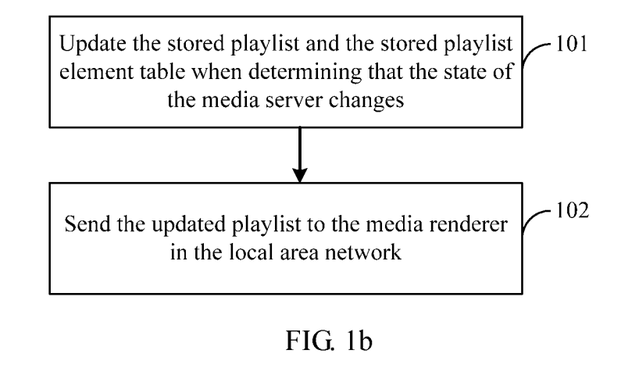
FIG. 1b is a flowchart of a method for processing a media resource playlist in a local area network according to an embodiment of the present invention.

As shown in FIG. 1b, the specific procedure may be as follows:

101. Update the stored playlist (Playlist) and stored playlist element table (Playlist element table) when determining that the state of the media server in the local area network changes.

The playlist may include information such as a URL of a media resource and a file name of the media resource; the playlist element table may include at least one of a media resource identifier (ResourceID, Resource Identifier), a media server identifier, an IP address of the media server, and the URL of the media resource, where the media server identifier may be specifically a Uniform unique identifier (UUID, Uniform Unique Identifier) of the media server.

102. Send the updated playlist to the media renderer in the local area network.

As seen above, in this embodiment, when it is determined that the state of the media server changes, the stored playlist and the stored playlist element table are updated, and the updated playlist is sent to the media renderer in the local area network. In the embodiment of the present invention, because the playlist can be updated in real time, consistency between the playlist and the media source can be ensured, so that a continuously valid playlist may be provided to improve the play experience of a user.

Embodiment 2

Figure 2:
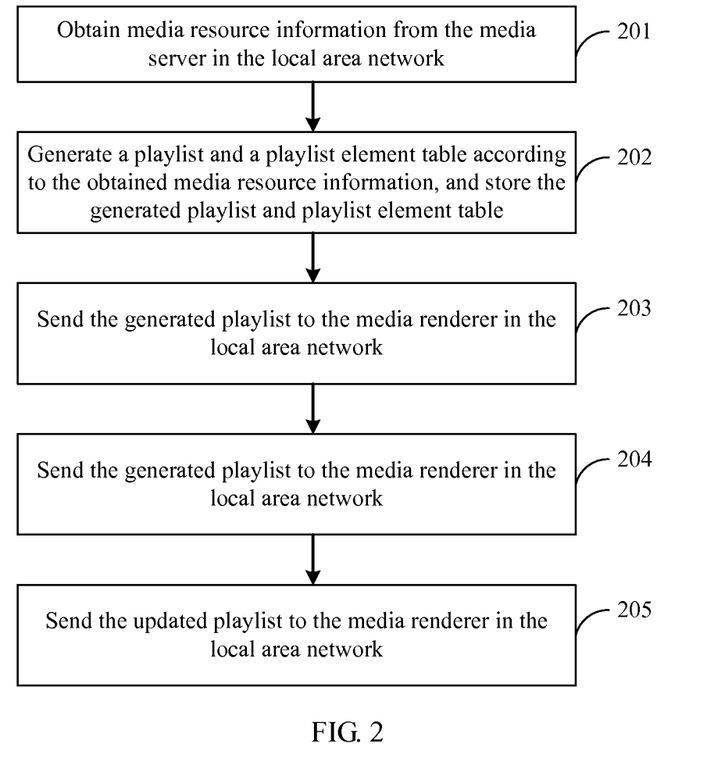
FIG. 2 is another flowchart of a method for processing a media resource playlist in a local area network according to an embodiment of the present invention.

According to the method described in the first embodiment, before the step of "updating the stored playlist and playlist element table when determining that the state of the media server in the local area network changes (namely, step 101)", the playlist processing apparatus may further generate a playlist and a playlist element table, and send the generated playlist and playlist element table to the media renderer. For example, as shown in FIG. 2, the specific procedure of the method for processing a media resource playlist in a local area network may be as follows:

201. Obtain media resource information from the media server in the local area network.

For example, specifically, the media resource information may be obtained by sending a browse request (Browse( )) or a search request (Search( )) to the media server, as detailed below:

the playlist processing apparatus sends a browse request or a search request to the media server; and the media server returns media resource information to the playlist processing apparatus after receiving the browse request or search request.

The media resource information may include information such as a media resource identifier, a media server identifier, an Internet Protocol (IP, Internet Protocol) address of the media server, and a uniform resource locator (URL, Uniform Resource Locator) of a media resource, and in addition, may include information such as the file name of the media resource.

202. Generate a playlist and a playlist element table according to the media resource information obtained in step 201, and store the generated playlist and playlist element table.

The playlist may include information such as the URL of the media resource and the file name of the media resource; the playlist element table may include at least one of the media resource identifier, the media server identifier, the IP address of the media server, and the URL of the media resource, where the media server identifier may be specifically a UUID of the media server.

203. Send the generated playlist to the media renderer in the local area network.

For example, specifically, the media renderer may be requested to invoke a "set static playlist" action class, namely, SetStaticPlaylist( )action, so that a playlist is delivered to the media renderer.

204. Update the stored playlist and the stored playlist element table when determining that the state of the media server changes.

The state change of the media server refers to scenarios where the IP address of the media server changes, the media server is offline, or the media resource of the media server changes, and so on, that is, step 204 may be specifically implemented in one or more of the following modes:

(1) Update the stored playlist and the stored playlist element table when determining, according to the stored playlist element table, that the IP address of the media server changes, as detailed below:

receiving an online announcement message sent by the media server, for example, a Simple Service Discovery Protocol (SSDP, Simple Service Discovery Protocol) message, where the online announcement message carries the IP address of the media server and the media server identifier; and when determining that the IP address of the media server and the media server identifier carried in the online announcement message are inconsistent with the IP address and the media server identifier in the stored playlist element table, updating the IP address related content in the stored playlist, and updating the IP address of the media server in the playlist element table.

For example, specifically, the corresponding IP address may be found in the stored playlist element table according to the media server identifier carried in the online announcement message, and then the IP address of the media server carried in the online announcement message is compared with the found IP address and if consistent, no action is performed, or if inconsistent, the IP address related content in the stored playlist is updated, and the found IP address is updated.

The IP address related content indicates a record related to the IP address, for example, a URL.

(2) Update the stored playlist and the stored playlist element table when determining that the media server is offline, as detailed below:

if a message indicating that the media server is offline is received or no online announcement message (for example, an SSDP message) sent by the media server is received within a preset time, determining that the media server is offline, and deleting the record corresponding to the media server in the stored playlist, or marking the record corresponding to the media server in the stored playlist as unavailable.

Because the media server sends the online announcement message to the control point or the central server periodically, if the control point or the central server does not receive the online announcement message from the media server within a certain time, it indicates that the media server is offline; in this case, the record corresponding to the media server in the stored playlist and the stored playlist element table may be deleted to avoid deterioration of user experience quality caused by clicking the invalid items. The length of the time may be set according to the actual application requirement.

(3) Update the stored playlist and the stored playlist element table when determining that the media resource of the media server changes, as detailed below:

receiving an event (Event) reported by the media server, where the event indicates the changed media resource on the media server; and updating the record corresponding to the changed media resource in the stored playlist according to the received event, and updating the record corresponding to the changed media resource in the playlist element table according to the event.

For example, specifically, the media resource identifier may be determined according to the event; then the corresponding record in the playlist element table and the stored playlist is found respectively according to the media resource identifier (that is, searching for the corresponding record in the playlist element table and searching for the corresponding record in the playlist); the URL of the media resource in the record is updated, and the URL of the media resource in the found record in the playlist is updated.

205. Send the updated playlist to the media renderer in the local area network, so that the media renderer uses the updated playlist to replace the original playlist. In this way, the control point can find the updated playlist when querying the playlist of the media renderer, thereby ensuring consistency between the playlist and the media source, that is, ensuring that the playlist is valid.

In addition, the method for processing a media resource playlist in a local area network may further include:

querying the playlist on the media renderer; and sending a play request to the media renderer according to the found playlist on the media renderer, where the play request carries a playlist identifier and a media resource identifier so that the media renderer plays a media resource according to the playlist identifier and media resource identifier.

Specifically, the media server may be a terminal device with a storage function such as a smart phone, a personal computer, a digital camera, a notebook computer, a portable media player, or a removable hard disk. Specifically, the media renderer may be a terminal device capable of displaying media such as a digital television set, a notebook computer, or a personal computer.

As seen above, in this embodiment, media resource information is obtained from the media server in the local area network; a playlist and a playlist element table are generated according to the media resource information and stored; the generated playlist is sent to the media renderer in the local area network; then the stored playlist and the stored playlist element table are updated when it is determined that the state of the media server changes, and the updated playlist is sent to the media renderer in the local area network. In the embodiment of the present invention, because the playlist can be updated in real time, consistency between the playlist and the media source can be ensured, so that a continuously valid playlist may be provided to improve the play experience of a user.

Embodiment 3

A detailed description is provided hereunder by using some examples according to the methods described in the first and second embodiments.

This embodiment is described by using an example in which the playlist processing apparatus is specifically a control point. Specifically, the control point may be integrated into a media renderer, or may also be integrated into a media server, or may also be integrated into some intermediate devices, such as a set top box, a gateway, or an access point device, or may also be a separate entity.

Figure 3:
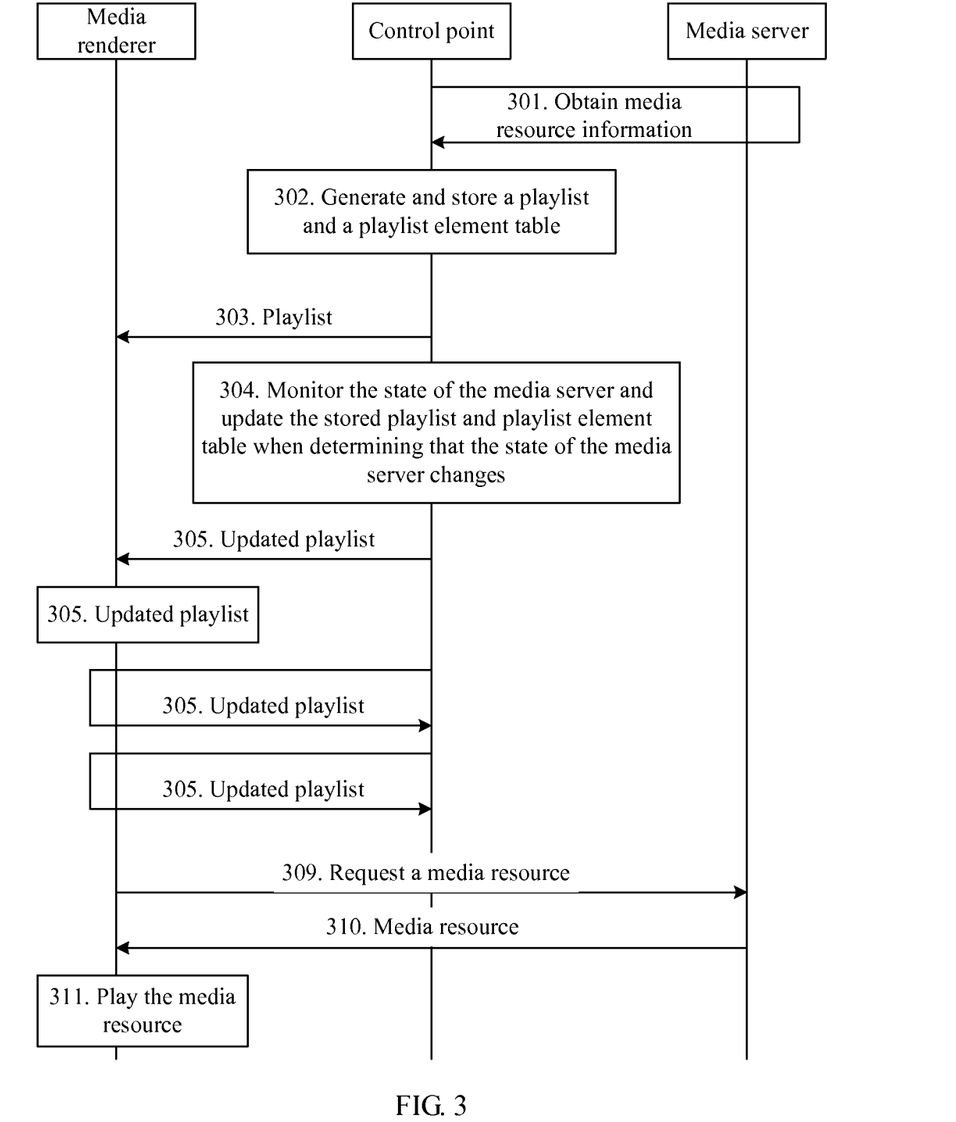
FIG. 3 is still another flowchart of a method for processing a media resource playlist in a local area network according to an embodiment of the present invention.

As shown in FIG. 3, the specific procedure may be as follows:

301. The control point obtains media resource information from the media server in the local area network.

For example, specifically, the media resource information may be obtained by sending a browse request (Browse( )) or a search request (Search( )) to the media server, as detailed below:

the control point sends a browse request or a search request to the media server; and the media server returns media resource information to the control point after receiving the browse request or search request.

The media resource information may include information such as a media resource identifier, a media server identifier, an IP address of the media server, and a URL of a media resource, and in addition, may include information such as a file name of the media resource.

302. The control point generates a playlist and a playlist element table according to the media resource information obtained in step 301, and stores the generated playlist and playlist element table.

The playlist may include the information such as the URL of the media resource and the file name of the media resource. For example, the specific format of the playlist may be as shown in Table 1.

TABLE 1

| File Name of Media Resources | URL |
| --- | --- |
| The Adventures of Zhang San | http://ip/content1 |
| Story About Li Si | http://ip/content2 |
| ... | ... |

A user can select, through the playlist, a media resource to be displayed on the media renderer. For example, when the user wants to play "The Adventures of Zhang San" on the media renderer, the user selects the option with the file name "The Adventures of Zhang San" from the playlist.

The playlist element table may include one or more of the media resource identifier, the media server identifier, the IP address of the media server, and the URL of the media resource, where the media server identifier may be specifically a UUID of the media server. All the following embodiments are described by using an example in which the media server identifier is specifically a UUID. For example, the specific format of the playlist element table may be as shown in Table 2.

TABLE 2

| Media Resource Identifier | Media Server Identifier (MS ID) | IP | URL |
| --- | --- | --- | --- |
| ResourceID1 | UUID1 | 192.168.5.11 | http://ip/content1 |
| ResourceID2 | UUID2 | 192.168.5.9 | http://ip/content2 |
| ... | ... | ... | ... |

303. The control point sends the generated playlist to the media renderer.

For example, the control point may request the media renderer to invoke a "set static playlist" action class, namely, "SetStaticPlaylist( )action", to deliver a playlist to the media renderer.

Arguments of "SetStaticPlaylist( )" may specifically include the information such as the identifier (ID, Identity) of the playlist stored on the media renderer, content of the playlist, and -data length of the playlist, as exemplified in Table 3.

TABLE 3

| Argument (Argument) | Direction (Direction) | Related State Variable (RelatedStateVariable) |
| --- | --- | --- |
| InstanceID | IN | Identifier of the playlist stored on the media renderer |
| PlaylistData | IN | Content of the playlist |
| PlaylistDataLength | IN | Byte length of the playlist |

"InstanceID" indicates the identifier of the playlist stored on the media renderer, namely, a storage identifier allocated by the media renderer to the playlist when the playlist is stored on the media renderer, and used to indicate the storage location of the playlist for querying and searching; "PlaylistData" indicates content of the playlist; and "PlaylistDataLength" indicates the byte length of the playlist. "IN" indicates that the state of the corresponding argument is "input".

304. The control point monitors the state of the media server in the local area network through an online announcement message, for example, an SSDP message (in the following description, the SSDP message is used as an online announcement message), and updates the stored playlist and the stored playlist element table when determining that the state of the media server changes. For example, the specific process may be as follows:

(1) The control point updates the stored playlist and the stored playlist element table when determining, according to the stored playlist element table, that the IP address of the media server changes, as detailed below:

the control point receives the SSDP message sent by the media server, where the SSDP message carries the IP address of the media server and the media server identifier; and when determining that the IP address of the media server and the media server identifier carried in the SSDP message are inconsistent with the IP address and the media server identifier in the stored playlist element table, the control point updates the IP address related content in the stored playlist, and updates the IP address of the media server in the playlist element table.

For example, if the media server identifier carried in the SSDP message is "UUID1", and the IP address of the media server carried in the SSDP message is "192.168.5.12", it is known, according to Table 2, that the IP address of the media server corresponding to "UUID1" is "192.168.5.11" and is different from the IP address "192.168.5.12" of the media server carried in the SSDP message; therefore, "192.168.5.11" in Table 2 is updated to "192.168.5.12", and the IP address "192.168.5.11" related content in the playlist is also updated, for example, the original URL "http://192.168.5.11/content1" is updated to "http://192.168.5.12/content1".

(2) The control point updates the stored playlist and the stored playlist element table when determining that the media server is offline, as detailed below:

If a message indicating that the media server is offline is received or no SSDP message sent by the media server is received within a preset time, the control point determines that the media server is offline, and deletes the record corresponding to the media server in the stored playlist, or marks the record corresponding to the media server in the stored playlist with "unavailable".

Because the media server sends the SSDP message to the control point or the central server periodically, if the control point or the central server does not receive the SSDP message from the media server within a certain time, it indicates that the media server is offline; in this case, the record corresponding to the media server in the stored playlist and the stored playlist element table may be deleted to avoid deterioration of user experience quality caused by clicking the invalid items. The length of the time may be set according to the actual application requirement.

(3) The control point updates the stored playlist and the stored playlist element table when determining that the media resource of the media server changes, as detailed below:

the control point receives an event reported by the media server, where the event indicates the changed media resource on the media server; and updates the record corresponding to the changed media resource in the stored playlist according to the received event, and updates the record corresponding to the changed media resource in the playlist element table according to the event.

For example, specifically, the media resource identifier may be determined according to the event; then the corresponding record in the playlist element table and the stored playlist is found respectively according to the media resource identifier (that is, searching for the corresponding record in the playlist element table and searching for the corresponding record in the playlist); the URL of the media resource in the record is updated, and the URL of the media resource in the found record in the playlist is updated.

305. The control point sends the updated playlist to the media renderer.

For example, the control point may request the media renderer to invoke a "set static playlist" action class, namely, "SetStaticPlaylist( )action", to deliver the updated playlist to the media renderer.

Arguments of "SetStaticPlaylist( )" may specifically include the information such as the identifier of the playlist stored on the media renderer, content of the playlist, and byte length of the playlist, as exemplified in Table 4.

TABLE 4

| Argument (Argument) | Direction (Direction) | Related state variable- (RelatedStateVariable) |
|---|---|---|
| InstanceID | IN | Identifier of the playlist stored on the media renderer |
| PlaylistData | IN | Content of the playlist |
| PlaylistDataLength | IN | Byte length of the playlist |

"InstanceID" indicates the identifier of the playlist stored on the media renderer, namely, a storage identifier allocated by the media renderer to the playlist when the playlist is stored on the media renderer, and used to indicate the storage location of the playlist for querying and searching; "PlaylistData" indicates content of the playlist; and "PlaylistDataLength" indicates the byte length of the playlist. "IN" indicates that the state of the corresponding argument is "input".

306. The media renderer uses the received updated playlist to replace the original playlist.

307. The control point queries the playlist on the media renderer.

For example, an action class (action) may be added to the media renderer: ScanPlaylist( ) action; in this way, the control point can request the media renderer to invoke the action to query the playlist stored on the media renderer.

Arguments of "ScanPlaylist( )" may specifically include the information such as the identifier of the playlist stored on the media renderer, content of the playlist, and byte length of the playlist, as exemplified in Table 5.

TABLE 5

| Argument (Argument) | Direction (Direction) | Related State Variable (RelatedStateVariable) |
|---|---|---|
| InstanceID | OUT | Identifier of the playlist stored on the media renderer |
| PlaylistData | OUT | Content of the playlist |
| PlaylistDataLength | OUT | Byte length of the playlist |

"InstanceID" indicates the identifier of the playlist stored on the media renderer, namely, a storage identifier allocated by the media renderer to the playlist when the playlist is stored on the media renderer, and used to indicate the storage location of the playlist for querying and searching; "PlaylistData" indicates content of the playlist; and "PlaylistDataLength" indicates the byte length of the playlist. "OUT" indicates that the state of the corresponding argument is "output".

308. The control point selects a playlist from at least one playlist displayed by the media renderer, and requests the media renderer to play the playlist, for example, the control point may invoke the "play" action class, Play( )action, in the media renderer to request to play the playlist.

Arguments of "Play( )" may specifically include the information such as the identifier (ID, Identity) of the playlist stored on the media renderer, and a serial number of a content item and a play speed of the playlist, as exemplified in Table 6.

TABLE 6

| Argument (Argument) | Direction (Direction) | Related State Variable (RelatedStateVariable) |
|---|---|---|
| InstanceID | IN | Identifier of the playlist stored on the media renderer |
| Index | IN | Serial number of content item of the playlist, used to indicate which content is played |
| Speed | IN | Play speed |

"InstanceID" indicates the identifier of the playlist stored on the media renderer; "Index" indicates the serial number of content item of the playlist; and "Speed" indicates the play speed. "IN" indicates that the state of the corresponding argument is "input".

309. The media renderer requests the media resource from the media server according to the playlist selected by the control point.

For example, the media renderer may request the media resource from the media server pointed to by a URI (uniform resource identifier) in the selected playlist through "HTTP Get".

310. The media server transmits the media resource to the media renderer.

For example, the media server may respond to the "HTTP Get" request of the media renderer, and transmit the media resource to the media renderer.

311. The media renderer plays the media resource.

As seen above, in this embodiment, the control point obtains media resource information from the media server in the local area network, generates a playlist and a playlist element table according to the media resource information and stores the playlist and the playlist element table, sends the generated playlist to the media renderer in the local area network, then updates the stored playlist and the stored playlist element table when determining that the state of the media server changes, and sends the updated playlist to the media renderer in the local area network, so that the media resource may be played subsequently according to the updated playlist. In the embodiment of the present invention, because the playlist can be updated in real time, consistency between the playlist and the media source can be ensured, so that a continuously valid playlist may be provided to improve the play experience of a user.

Embodiment 4

Different from the third embodiment, this embodiment is described by using an example in which the playlist processing apparatus is specifically a control point and a central server. Specifically, the control point may be integrated into a media renderer, or may also be integrated into a media server or a central server, or may also be integrated into some intermediate devices, such as a set top box, a gateway, or an access point device, or may also be a separate entity. The central server may be specifically a terminal device such as a set top box, a gateway, or an access point device. The control point and the central server may be located in the same entity or may also be located in different entities.

Figure 4:
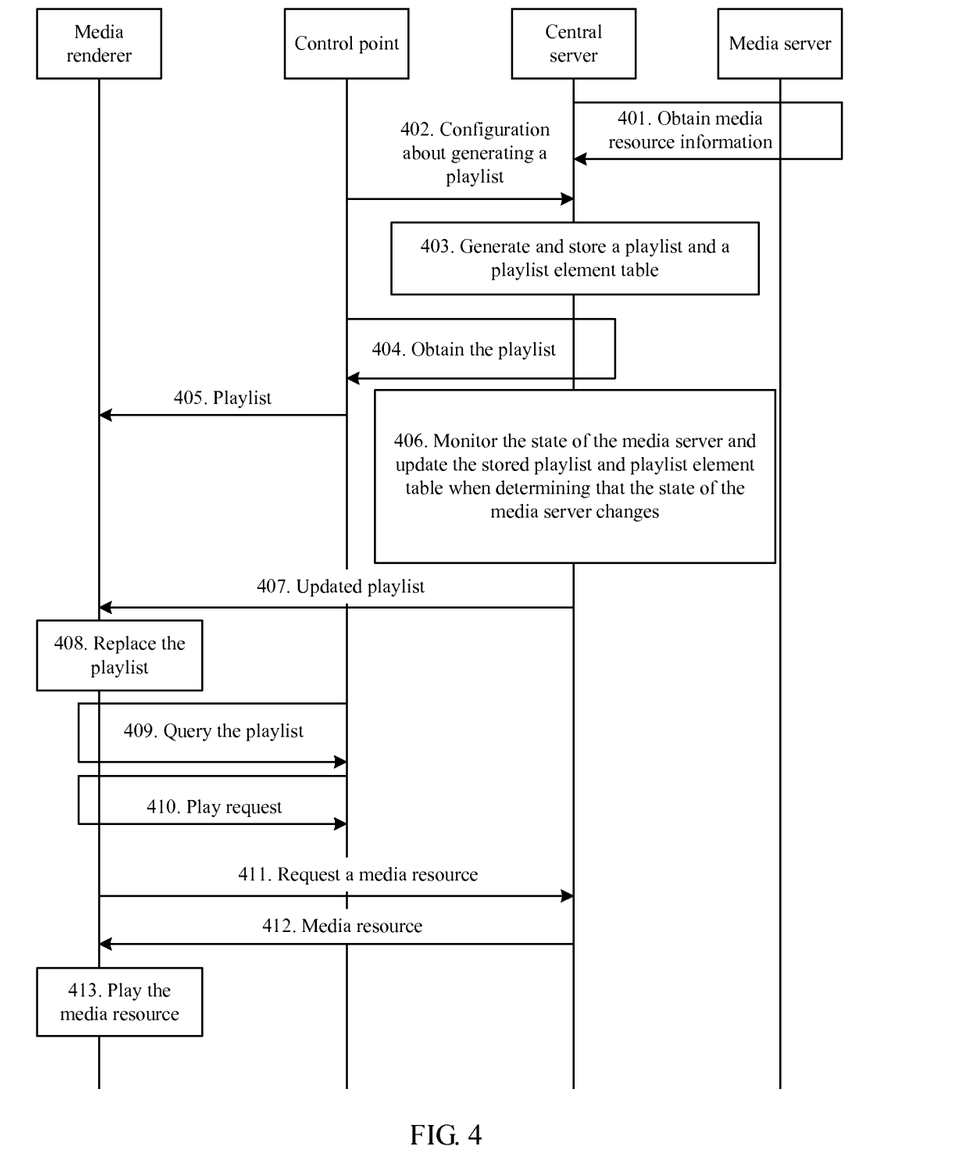
FIG. 4 is still another flowchart of a method for processing a media resource playlist in a local area network according to an embodiment of the present invention.

As shown in FIG. 4, the specific procedure may be as follows:

401. The central server obtains media resource information from the media server in the local area network.

For example, specifically, the media resource information may be obtained by sending a browse request (Browse( )) or a search request (Search( )) to the media server, as detailed below:

the central server sends a browse request or a search request to the media server; and the media server returns media resource information to the central server after receiving the browse request or search request.

The media resource information may include information such as a media resource identifier, a media server identifier, an IP address of the media server, and a URL of a media resource, and in addition, may include information such as a file name of the media resource.

402. The control point performs configuration about generating a playlist for the central server, for example, configures the central server to generate a playlist of all media files whose file name extensions are "MP3" in the local area network.

403. The central server generates a playlist and a playlist element table according to the media resource information obtained in step 401 and the configuration in step 402, and stores the generated playlist and playlist element table.

The playlist may include the information such as the URL of the media resource and the file name of the media resource. For example, the specific format of the playlist may be as shown in Table 7.

TABLE 7

| File Name of Media Resources | URL |
|---|---|
| The Adventures of Zhang San | http://ip/content1 |
| Story About Li Si | http://ip/content2 |
| ... | ... |

A user can select, through the playlist, a media resource to be displayed on the media renderer. For example, when the user wants to play "The Adventures of Zhang San" on the media renderer, the user selects the option with the file name "The Adventures of Zhang San" from the playlist.

The playlist element table may include one or more of the media resource identifier, the media server identifier, the IP address of the media server, and the URL of the media resource, where the media server identifier may be specifically a UUID of the media server. All the following embodiments are described by using an example in which the media server identifier is specifically a UUID. For example, the specific format of the playlist element table may be as shown in Table 8.

TABLE 8

| Media Resource Identifier | Media Server Identifier (MS ID) | IP | URL |
|---|---|---|---|
| ResourceID1 | UUID1 | 192.168.5.11 | http://ip/content1 |
| ResourceID2 | UUID2 | 192.168.5.9 | http://ip/content2 |
| ... | ... | ... | ... |

404. The control point obtains the playlist on the central server.

For example, an action class (action) may be added to the central server: ScanPlaylist( ) action; in this way, the control point can request to invoke the action to obtain the playlist stored on the central server.

Arguments of "ScanPlaylist( )" may specifically include the information such as the identifier of the playlist stored on the media renderer, content of the playlist, and byte length of the playlist, as exemplified in Table 9.

TABLE 9

| Argument (Argument) | Direction (Direction) | Related State Variable (RelatedStateVariable) |
|---|---|---|
| InstanceID | OUT | Identifier of the playlist stored on the media renderer |
| PlaylistData | OUT | Content of the playlist |
| PlaylistDataLength | OUT | Byte length of the playlist |

"InstanceID" indicates the identifier of the playlist stored on the media renderer; "PlaylistData" indicates the content of the playlist; and "PlaylistDataLength" indicates the byte length of the playlist. "OUT" indicates that the state of the corresponding argument is "output".

405. The control point sends the obtained playlist to the media renderer.

For example, the control point may request the media renderer to invoke a "set static playlist" action class, namely, "SetStaticPlaylist( )action", to deliver a playlist to the media renderer.

Arguments of "SetStaticPlaylist( )" may specifically include the information such as the identifier (ID, Identity) of the playlist stored on the media renderer, content of the playlist, and byte length of the playlist, as exemplified in Table 10.

TABLE 10

| Argument (Argument) | Direction (Direction) | Related State Variable (RelatedStateVariable) |
|---|---|---|
| InstanceID | IN | Identifier of the playlist stored on the media renderer |
| PlaylistData | IN | Content of the playlist |
| PlaylistDataLength | IN | Byte length of the playlist |

"InstanceID" indicates the identifier of the playlist stored on the media renderer; "PlaylistData" indicates the content of the playlist; and "PlaylistDataLength" indicates the byte length of the playlist. "IN" indicates that the state of the corresponding argument is "input".

406. The central server monitors the state of the media server in the local area network through an online announcement message, for example, an SSDP message, and updates the stored playlist and the stored playlist element table when determining that the state of the media server changes. For example, the specific process may be as follows:

(1) The central server updates the stored playlist and the stored playlist element table when determining, according to the stored playlist element table, that the IP address of the media server changes, as detailed below:

The central server receives the SSDP message sent by the media server, where the SSDP message carries the IP address of the media server and the media server identifier.

When the central server determines that the IP address of the media server and the media server identifier carried in the SSDP message are inconsistent with the IP address and the media server identifier in the stored playlist element table, the central server updates the IP address related content in the stored playlist, and updates the IP address of the media server in the playlist element table.

For example, if the media server identifier carried in the SSDP message is "UUID1", and the IP address of the media server in the SSDP message is "192.168.5.12", it is known, according to Table 2, that the IP address of the media server corresponding to "UUID1" is "192.168.5.11" and is different from the IP address "192.168.5.12" of the media server carried in the SSDP message; therefore, "192.168.5.11" in Table 2 is updated to "192.168.5.12", and the IP address "192.168.5.11" related content in the playlist is also updated.

(2) The central server updates the stored playlist and the stored playlist element table when determining that the media server is offline, as detailed below:

If a message indicating that the media server is offline is received or no SSDP message sent by the media server is received within a preset time, the central server determines that the media server is offline, and deletes the record corresponding to the media server in the stored playlist, or marks the record corresponding to the media server in the stored playlist as "unavailable".

Because the media server sends the SSDP message to the control point or the central server periodically, if the control point or the central server does not receive the SSDP message from the media server within a certain time, it indicates that the media server is offline; in this case, the record corresponding to the media server in the stored playlist and the stored playlist element table may be deleted to avoid deterioration of user experience quality caused by clicking the invalid items. The length of the time may be set according to the actual application requirement.

(3) The central server updates the stored playlist and the stored playlist element table when determining that the media resource of the media server changes, as detailed below:

the central server receives an event reported by the media server, where the event indicates the changed media resource on the media server; and the central server updates the record corresponding to the changed media resource in the stored playlist according to the event, and updates the record corresponding to the changed media resource in the playlist element table according to the event.

For example, specifically, the central server may determine the media resource identifier according to the event, then search for the corresponding record respectively in the playlist element table and the stored playlist according to the media resource identifier (that is, searching for the corresponding record in the playlist element table and searching for the corresponding record in the playlist), update the URL of the media resource in the record, and update the URL of the media resource in the found record in the playlist.

407. The central server sends the updated playlist to the media renderer.

For example, the central server may request the media renderer to invoke a "set static playlist" action class, namely, "SetStaticPlaylist( )action", to deliver the updated playlist to the media renderer.

Arguments of "SetStaticPlaylist( )" may specifically include the information such as the identifier of the playlist stored on the media renderer, content of the playlist, and byte length of the playlist, as exemplified in Table 11.

TABLE 11

| Argument (Argument) | Direction (Direction) | Related state variable, (RelatedStateVariable) |
|---|---|---|
| InstanceID | IN | Identifier of the playlist stored on the media renderer |
| PlaylistData | IN | Content of the playlist |
| PlaylistDataLength | IN | Byte length of the playlist |

"InstanceID" indicates the identifier of the playlist stored on the media renderer; "PlaylistData" indicates the content of the playlist; and "PlaylistDataLength" indicates the byte length of the playlist. "IN" indicates that the state of the corresponding argument is "input".

408. The media renderer uses the received updated playlist to replace the original playlist.

409. The control point queries the playlist on the media renderer.

For example, an action class (action) may be added to the media renderer: ScanPlaylist( ) action; in this way, the control point can request to invoke the action to query the playlist stored on the media renderer.

Arguments of "ScanPlaylist( )" may specifically include the information such as the identifier of the playlist stored on the media renderer, content of the playlist, and byte length of the playlist, as exemplified in Table 12.

TABLE 12

| Argument (Argument) | Direction (Direction) | Related State Variable (Related StateVariable) |
|---|---|---|
| InstanceID | OUT | Identifier of the playlist stored on the media renderer |
| PlaylistData | OUT | Content of the playlist |
| PlaylistDataLength | OUT | Byte length of the playlist |

"InstanceID" indicates the identifier of the playlist stored on the media renderer; "PlaylistData" indicates the content of the playlist; and "PlaylistDataLength" indicates the byte length of the playlist. "IN" indicates that the state of the corresponding argument is "output".

410. The control point selects a playlist from at least one playlist displayed by the media renderer, and requests the media renderer to play the playlist, for example, the control point may invoke the "play" action class, Play( )action, in the media renderer to request to play the playlist.

Arguments of "Play( )" may specifically include the information such as the identifier (ID, Identity) of the playlist stored on the media renderer, and a serial number of content item and a play speed of the playlist, as exemplified in Table 13.

TABLE 13

| Argument (Argument) | Direction (Direction) | Related State Variable (RelatedStateVariable) |
|---|---|---|
| InstanceID | IN | Identifier of the playlist stored on the media renderer |
| Index | IN | Serial number of content items of the playlist, used to indicate which content is played |
| Speed | IN | Play speed |

"InstanceID" indicates the identifier of the playlist stored on the media renderer; "Index" indicates the serial number of content item of the playlist; and "Speed" indicates the play speed. "IN" indicates that the state of the corresponding argument is "input".

411. The media renderer requests the media resource from the media server according to the playlist selected by the control point.

For example, the media renderer may request the media resource from the media server pointed to by the URI in the selected playlist through "HTTP Get".

412. The media server transmits the media resource to the media renderer.

For example, the media server may respond to the "HTTP Get" request of the media renderer, and transmit the media resource to the media renderer.

413. The media renderer plays the media resource.

As seen above, in this embodiment, the central server obtains media resource information from the media server in the local area network, generates a playlist and a playlist element table according to the media resource information and stores the playlist and the playlist element table, sends the generated playlist to the media renderer in the local area network through the control point, then updates the stored playlist and the stored playlist element table when determining that the state of the media server changes, and sends the updated playlist to the media renderer in the local area network, so that the media resource may be played subsequently according to the updated playlist. In the embodiment of the present invention, because the playlist can be updated in real time, consistency between the playlist and the media source can be ensured, so that a continuously valid playlist may be provided to improve the play experience of a user.

Embodiment 5

Figure 5A:
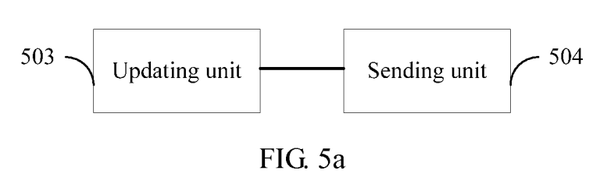
FIG. 5a is a schematic structural diagram of a playlist processing apparatus according to an embodiment of the present invention.

To better implement the above method, the embodiment of the present invention further provides a playlist processing apparatus accordingly; as shown in FIG. 5a, the playlist processing apparatus includes an updating unit 503 and a sending unit 504.

The updating unit 503 is configured to update a stored playlist and a stored playlist element table when determining that the state of a media server in a local area network changes.

The playlist may include information such as a URL of a media resource and a file name of the media resource; the playlist element table may include at least one of a media resource identifier, a media server identifier, an IP address of the media server, and the URL of the media resource, where the media server identifier may be specifically a UUID of the media server.

The sending unit 504 is configured to send the updated playlist to a media renderer in the local area network when the playlist is updated.

Figure 5B:
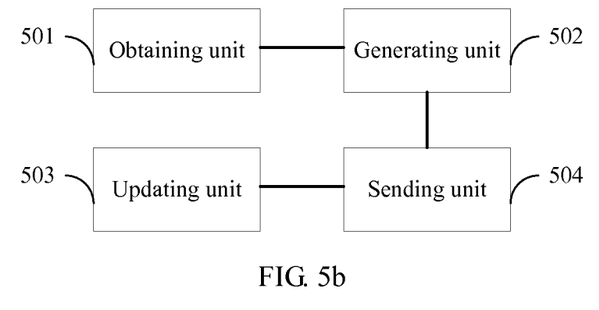
FIG. 5b is a schematic structural diagram of a playlist processing apparatus according to an embodiment of the present invention.

In addition, as shown in FIG. 5b, the playlist processing apparatus may further include an obtaining unit 501 and a generating unit 502.

The obtaining unit 501 is configured to obtain media resource information from the media server in the local area network.

For example, specifically, the media resource information may be obtained by sending a browse request or a search request to the media server.

The media resource information may include information such as a media resource identifier, a media server identifier, an IP address of the media server, and a URL of a media resource, and in addition, may include information such as a file name of the media resource.

The generating unit 502 is configured to generate a playlist and a playlist element table according to the media resource information obtained by the obtaining unit 501, and store the playlist and the playlist element table.

The playlist may include information such as a URL of a media resource and a file name of the media resource; the playlist element table may include at least one of a media resource identifier, a media server identifier, an IP address of the media server, and the URL of the media resource, where the media server identifier may be specifically a UUID of the media server.

In this case, the updating unit 503 is specifically configured to update the playlist and playlist element table stored by the generating unit 502, when determining that the state of the media server changes.

The sending unit 504 is specifically configured to send the playlist generated by the generating unit 502 to the media renderer in the local area network, and when the playlist is updated, send the playlist updated by the updating unit 503 to the media renderer in the local area network.

For example, specifically, the media renderer may be requested to invoke a "set static playlist" action class, namely, SetStaticPlaylist( )action, so that a playlist is delivered to the media renderer.

The state change of the media server refers to scenarios where the IP address of the media server changes, the media server is offline, or the media resource of the media server changes, and so on, that is, the updating unit 503 includes a first updating subunit, and/or a second updating subunit, and/or a third updating subunit.

The first updating subunit may be specifically configured to update the stored playlist and the stored playlist element table when determining, according to the stored playlist element table, that the Internet Protocol address of the media server changes.

The second updating subunit may be specifically configured to update the stored playlist and the stored playlist element table when determining that the media server is offline.

The third updating subunit may be specifically configured to update the stored playlist and the stored playlist element table when determining that the media resource of the media server changes.

For example, the first updating subunit may be specifically configured to: receive an online announcement message sent by the media server, where the online announcement message carries an IP address of the media server and a media server identifier; and when determining that the IP address of the media server and the media server identifier carried in the online announcement message are inconsistent with the IP address and the media server identifier in the playlist element table, update IP address related content in the stored playlist, for example, a URL, and update the IP address of the media server in the playlist element table; and/or the second updating subunit may be specifically configured to: if no online announcement message sent by the media server is received within a preset time, determine that the media server is offline, and delete the record corresponding to the media server in the stored playlist, or mark the record corresponding to the media server in the stored playlist as unavailable; and/or the third updating subunit may be specifically configured to: receive an event reported by the media server, where the event indicates the changed media resource on the media server, update the record corresponding to the changed media resource in the stored playlist according to the received event, and update the record corresponding to the changed media resource in the playlist element table according to the event.

The online announcement message may be specifically an SSDP message.

In addition, the playlist processing apparatus may include a list querying unit and a play requesting unit.

The list querying unit is configured to query the playlist on the media renderer.

The play requesting unit is configured to send a play request to the media renderer according to the found playlist on the media renderer, where the play request carries a playlist identifier and a media resource identifier so that the media renderer plays a media resource according to the playlist identifier and the media resource identifier.

In the specific implementation, the above units may be implemented by separate entities, or may be combined in any way and implemented by one or several entities. For the specific implementation of the above units, reference may be made to the above embodiments, and details are omitted herein.

Specifically, the playlist processing apparatus may be a control point, or the playlist processing apparatus may also include a control point and a central server, that is, the control point and the central server jointly perform operations. Specifically, the control point may be integrated with the media renderer into a same entity, or may also be integrated with the media server into a same entity, or may also be integrated with the central server into a same entity, or may be a separate entity. The central server may be specifically a terminal device such as a set top box, a gateway, or an access point device. The control point and the central server may be located in the same entity or may also be located in different entities.

Specifically, the media server may be a terminal device with a storage function such as a smart phone, a personal computer, a digital camera, a notebook computer, a portable media player, or a removable hard disk. Specifically, the media renderer may be a terminal device capable of displaying media such as a digital television set, a notebook computer, or a personal computer.

As seen above, in this embodiment, the obtaining unit 501 of the playlist processing apparatus may obtain media resource information from the media server in the local area network; the generating unit 502 generates a playlist and a playlist element table according to the media resource information and stores the playlist and the playlist element table; then the sending unit 504 sends the generated playlist to the media renderer in the local area network; the updating unit 503 updates the stored playlist and the stored playlist element table when determining that the state of the media server changes, and sends the updated playlist to the media renderer through the sending unit 504. In the embodiment of the present invention, because the playlist can be updated in real time, consistency between the playlist and the media source can be ensured, so that a continuously valid playlist may be provided to improve the play experience of a user.

Embodiment 6

Accordingly, the embodiment of the present invention further provides a communication system, including any playlist processing apparatus according to the embodiment of the present invention, where the playlist processing apparatus may specifically refer to the fifth embodiment. For example, the specific apparatus may be as follows:

The playlist processing apparatus is configured to: obtain media resource information from the media server in the local area network, generate a playlist and a playlist element table according to the media resource information, and store the playlist and the playlist element table; update the stored playlist and the stored playlist element table when determining that the state of the media server changes; and send the updated playlist to the media renderer in the local area network.

The playlist may include information such as a URL of a media resource and a file name of the media resource; the playlist element table may include at least one of a media resource identifier, a media server identifier, an IP address of the media server, and the URL of the media resource, where the media server identifier may be specifically a UUID of the media server.

The state change of the media server refers to scenarios where the IP address of the media server changes, the media server is offline, or the media resource of the media server changes, and so on.

The playlist processing apparatus is specifically configured to: update the stored playlist and the stored playlist element table when determining, according to the stored playlist element table, that the Internet Protocol address of the media server changes; or update the stored playlist and the stored playlist element table when determining that the media server is offline; or update the stored playlist and the stored playlist element table when determining that the media resource of the media server changes. For example, the specific process may be as follows:

(1) Update the stored playlist and the stored playlist element table when determining, according to the stored playlist element table, that the IP address of the media server changes, as detailed below:

receiving an online announcement message sent by the media server, where the online announcement message carries an IP address of the media server and a media server identifier; and when determining that the IP address of the media server and the media server identifier carried in the online announcement message are inconsistent with the IP address and the media server identifier in the stored playlist element table, updating the IP address related content in the stored playlist, for example, a URL, and updating the IP address of the media server in the playlist element table.

(2) Update the stored playlist and the stored playlist element table when determining that the media server is offline, as detailed below:

if no online announcement message sent by the media server is received within a preset time, determining that the media server is offline, and deleting the record corresponding to the media server in the stored playlist, or marking the record corresponding to the media server in the stored playlist as unavailable.

(3) Update the stored playlist and the stored playlist element table when determining that the media resource of the media server changes, as detailed below:

receiving an event reported by the media server, updating the record corresponding to the changed media resource in the stored playlist according to the received event, and updating the record corresponding to the changed media resource in the playlist element table according to the event.

The online announcement message may be specifically an SSDP message.

The playlist processing apparatus is further configured to: query the playlist on the media renderer; and send a play request to the media renderer according to the found playlist on the media renderer, where the play request carries a playlist identifier and a media resource identifier so that the media renderer plays a media resource according to the playlist identifier and the media resource identifier.

In addition, the communication system may further include a media renderer and a media server.

The media renderer is configured to: receive the playlist sent by the playlist processing apparatus, receive the play request sent by the playlist processing apparatus, obtain the media resource from the media server according to the play request of the playlist processing apparatus, and play the media resource.

The media server is configured to send the media resource information to the playlist processing apparatus and provide the resource to the media renderer for playing.

The specific implementation of the above devices may refer to the above embodiments, and details are omitted herein.

As seen above, in this embodiment, the playlist processing apparatus of the communication system obtains media resource information from the media server in the local area network, generates a playlist and a playlist element table according to the media resource information and stores the playlist and the playlist element table, sends the generated playlist to the media renderer in the local area network, then updates the stored playlist and the stored playlist element table when determining that the state of the media server changes, and sends the updated playlist to the media renderer in the local area network. In the embodiment of the present invention, because the playlist can be updated in real time, consistency between the playlist and the media source can be ensured, so that a continuously valid playlist may be provided to improve the play experience of a user.

Persons of ordinary skill in the art may understand that all or part of the steps of the various methods in the foregoing embodiments may be implemented by a program instructing relevant hardware. The program may be stored in a computer readable storage medium. The storage media may include: a read only memory (ROM, Read Only Memory), a random access memory (RAM, Random Access Memory), a magnetic disk, or a compact disk.

A method, an apparatus, and a system for processing a media resource playlist in a local area network that are provided in the embodiments of the present invention are introduced in detail in the foregoing. In this specification, specific examples are used for illustrating principles and implementation manners of the present invention. The foregoing descriptions of the embodiments are merely used to help understand the method and core idea of the present invention. Meanwhile, persons skilled in the art may make modifications to the specific implementation manners and application scopes according to the idea of the present invention. In conclusion, the content of the specification shall not be construed as a limitation to the present invention.

What is claimed is:

1. A method for processing a media resource playlist in a local area network, the method is implemented by a mobile terminal which comprises a hardware device, wherein upon executing program code stored in a memory, configure the mobile terminal to perform the method, and the method comprising:

obtaining by the mobile terminal, media resource information from a media server device, wherein the media server device and the mobile terminal are separate devices;

generating in the mobile terminal, a playlist and a playlist element table according to the media resource information;

storing in the mobile terminal, the playlist and the playlist element table;

updating in the mobile terminal, at least one of the stored playlist and the stored playlist element table when determining that a state of the media server device changes, the updated playlist comprises at least one of a uniform resource locator of a media resource and a file name of the media resource, and the playlist element table comprises at least one of a media resource identifier, a media server identifier, an Internet Protocol address of the media server, and the uniform resource locator of the media resource device, wherein the updating a stored playlist and a stored playlist element table when determining that a state of the media server device changes comprises updating in the mobile terminal, one of:

at least one of the stored playlist and the stored playlist element table when determining, according to the at least one of the stored playlist and the stored playlist element table, that the Internet Protocol address of the media server device changes;

at least one of the stored playlist and the stored playlist element table when determining that the media server device is offline; and at least one of the stored playlist and the stored playlist element table when determining that the media resource of the media server device changes, and wherein the updating in the mobile terminal, at least one of the stored playlist and the stored playlist element table when determining, according to the stored playlist element table, that the Internet Protocol address of the media server device changes comprises:

receiving by the mobile terminal, an online announcement message sent by the media server device, wherein the online announcement message carries the Internet Protocol address of the media server device and a media server identifier; and when determining that the Internet Protocol address of the media server device and the media server identifier carried in the online announcement message are inconsistent with the Internet Protocol address and the media server identifier in the stored playlist element table, at least one of updating Internet Protocol address related content in the stored playlist, and updating the Internet Protocol address of the media server device in the playlist element table; and sending by the mobile terminal, an updated playlist to a media rendering device, such that the updated playlist enable the media rendering device to continue playing a media resource according to the updated playlist without disruption despite the change of the state of the media server device.

2. The method according to claim 1, wherein in the mobile terminal, the updating at least one of the stored playlist and the stored playlist element table when determining that the media server device is offline comprises:
if a message indicating that the media server device is offline is received or no online announcement message sent by the media server device is received within a preset time, determining that the media server device is offline, and
deleting a record corresponding to the media server device in at least one of the stored playlist and in the stored playlist element table.

3. The method according to claim 1, wherein the updating in the mobile terminal, at least one of the stored playlist and the stored playlist element table when determining that the media server device is offline comprises:
if a message indicating that the media server device is offline is received or no online announcement message sent by the media server device is received within a preset time, determining that the media server device is offline, and
marking the record corresponding to the media server device in the stored playlist and/or in the stored playlist element table as unavailable.

4. The method according to claim 1, wherein the updating in the mobile terminal, at least one of the stored playlist and the stored playlist element table when determining that the media resource of the media server device changes comprises:
receiving an event reported by the media server device, wherein the event indicates the changed media resource on the media server device; and
updating at least one of:
a record corresponding to the changed media resource in the stored playlist according to the event; and
a record corresponding to the changed media resource in the playlist element table according to the event.

5. A mobile terminal, comprising:
a transceiver, configured to obtain media resource information from a media server device, wherein the media server device and the mobile terminal are separate devices;
a processor, configured to generate a playlist and a playlist element table according to the media resource information;
a memory, configured to store the playlist and the playlist element table;
the processor is further configured to:
update at least one of the stored playlist and the stored playlist element table when determining that a state of the media server device changes; wherein the playlist element table comprises a media server identifier and an Internet Protocol address of the media server, device; wherein the playlist comprises at least one of a uniform resource locator of a media resource and a file name of the media resource, and the playlist element table comprises at least one of a media resource identifier, a media server identifier, the Internet Protocol address of the media server device, and the uniform resource locator of the media resource, wherein the processor is configured to update in the mobile terminal, one of:
at least one of the stored playlist and the stored playlist element table when determining, according to the stored playlist element table, that the Internet Protocol address of the media server device changes;
at least one of the stored playlist and the stored playlist element table when determining that the media server device is offline; and
at least one of the stored playlist and the stored playlist element table when determining that the media resource of the media server device changes,
wherein the transceiver in the mobile terminal, is further configured to receive an online announcement message sent by the media server device, wherein the online announcement message carries the Internet Protocol address of the media server device and a media server identifier;
the processor is configured to determine that whether the Internet Protocol address of the media server device and the media server identifier carried in the online announcement message are inconsistent with the Internet Protocol address and the media server identifier in the stored playlist element table, if it is determined that the Internet Protocol address of the media server device and the media server identifier carried in the online announcement message are inconsistent with the Internet Protocol address and the media server identifier in the stored playlist element table, update Internet Protocol address related content in the stored playlist, and/or update the Internet Protocol address of the media server device in the playlist element table; and
send an updated playlist to a media player, such that the updated playlist enable the media player to continue playing a media resource according to the updated playlist without disruption despite the change of the state of the media server device.

6. The mobile terminal according to claim 5, wherein the transceiver in the mobile terminal, is further configured to receive a message indicating that the media server device is offline sent by the media server;
the processor in the mobile terminal, is configured to determine that the media server device is offline, and delete a record corresponding to the media server device in the stored playlist and/or in the stored playlist element table, or mark the record corresponding to the media server device in the stored playlist and/or in the stored playlist element table as unavailable, if the transceiver receives the message or does not receive any online announcement messages sent by the media server device within a preset time.

7. The mobile terminal according to claim 5, wherein the mobile terminal further comprises:
a transceiver, configured to receive an event reported by the media server device, wherein the event indicates the changed media resource on the media server device;
the processor is configured to update at least one of: a record corresponding to the changed media resource in the stored playlist according to the event, and a record corresponding to the changed media resource in the playlist element table according to the event.

* * * * *

UNITED STATES PATENT AND TRADEMARK OFFICE
CERTIFICATE OF CORRECTION

PATENT NO. : 9,773,001 B2
APPLICATION NO. : 14/707667
DATED : September 26, 2017
INVENTOR(S) : Zhenwei Shan et al.

It is certified that error appears in the above-identified patent and that said Letters Patent is hereby corrected as shown below:

On the Title Page

Left column, item (73), replace "Huawei Technologies Co., Ltd., Shenzhen (CN)" with --Huawei Device Co., Ltd., Shenzhen (CN)--.

Signed and Sealed this
Ninth Day of July, 2019

Andrei Iancu
*Director of the United States Patent and Trademark Office*